United States Patent Office 3,124,576
Patented Mar. 10, 1964

3,124,576
INTERMEDIATES FOR THE PREPARATION OF ANTIMICROBIAL AGENTS AND PROCESSES FOR THEIR PREPARATION
Robert John Stedman, Melrose Park, Pa., assignor to Smith Kline & French Laboratories, Philadelphia, Pa., a corporation of Pennsylvania
No Drawing. Filed Mar. 20, 1961, Ser. No. 96,644
8 Claims. (Cl. 260—243)

This invention relates to valuable intermediates for the production of antimicrobial agents and to processes for the preparation of these intermediates.

More specifically, this invention pertains to the compound 3-methyl-7-aminodecephalosporanic acid having the structure:

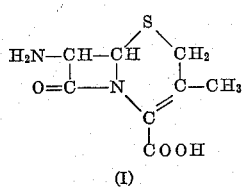
(I)

This compound is prepared according to the method of this invention from the known substance Cephalosporin C which may be represented by the structural formula:

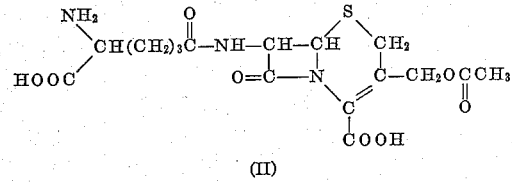
(II)

According to this invention, Cephalosporin C is subjected to catalytic hydrogenation under conditions whereby the acetoxymethylene group is reduced to a methyl group. The catalyst employed in this hydrogenation is chosen so as to be selective for the allylic ester group while not effecting the other reducible portions of the unsaturated heterocyclic nucleus. In this respect, I have found palladium-on-an-inert carrier to be particularly advantageous catalysts. Such include for example palladium-on-carbon, palladium-on-barium sulfate and the like. Although the inert organic solvent generally employed by the art for hydrogenation at atmospheric pressure may be employed, as for example dioxane and dimethylformamide, I have found water to be a highly satisfactory medium for the hydrogenation of Cephalosporin C. When water is thus employed, the sodium or potassium salt of Cephalosporin C may conveniently be used. Generally the hydrogenation is executed at low pressures such as in the range of atmospheric pressure, although higher pressures can be employed.

The product obtained subsequent to hydrogenation is then subjected to acid hydrolysis, thereby cleaving the α-aminoadipoyl side chain and yielding the desired 3-methyl - 7 - aminodecephalosporanic acid (I). I have found that this hydrolysis can be accomplished in an improved manner if the amino group of the α-aminoadipoyl side chain is protected by a grouping which is unaffected by the conditions of hydrolysis. Use of protective groupings formed by reagents such as 1-fluoro-2,4-dinitrobenzene, 1-fluoro-2-nitro-4-carbomethoxy-benzene, p-toluenesulfonyl chloride, phenylisocyanate and methylchloroformate result in improved yields and a higher quality of the desired hydrolysis product. Alternatively Cephalosporin C is treated with one of these reagents such as p-toluenesulfonyl chloride and the product so obtained then subjected to hydrogenation and hydrolysis.

Thus, the hydrogenation product is first treated with, for example, 1-fluoro-2,4-dinitrobenzene to yield the corresponding 2,4-dinitrobenzene derivative which is then subjected to the hydrolysis procedure herein described. Alternatively the hydrolysis is performed directly upon the hydrogenation product without formation of a derivative as herein described.

The hydrolysis is advantageously effected under aqueous conditions employing a mineral acid such as hydrochloric acid, sulfuric acid, or sulfonic acid or by use of an acidic ion exchange resin such as a sulfonated polystyrene resin. Thus, employing hydrochloric acid at a concentration of from 0.1 to 1 N with an aqueous miscible organic solvent such as acetonitrile, the reaction is executed in the dark and under an inert atmosphere such as nitrogen.

These reactions may be represented as follows:

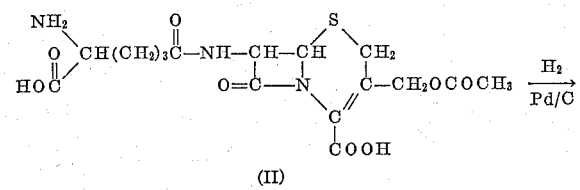
(II)

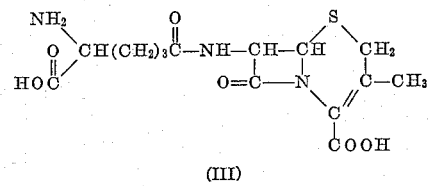
(III)

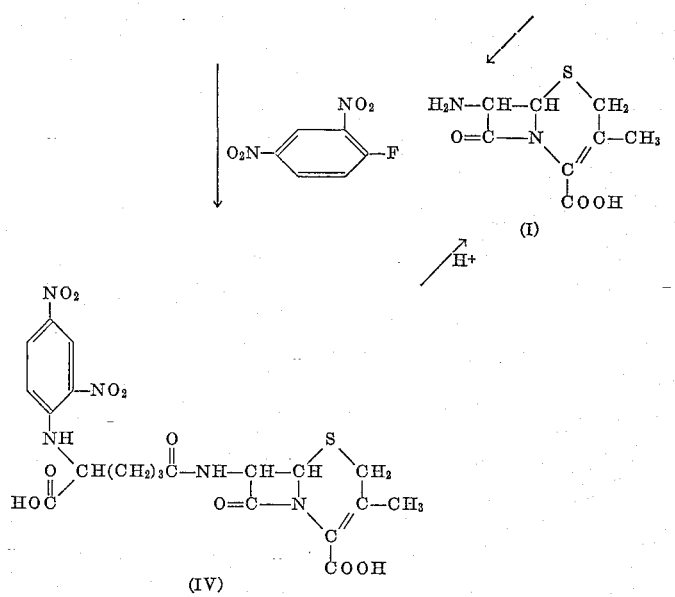

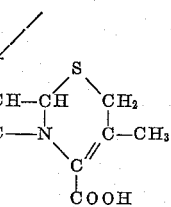

Alternatively 7-aminocephalosporanic acid obtained via acid hydrolysis of Cephalosporin C as described in Belgium Patent #593,777, may be subjected to the hydrogenation procedure herein described to yield 3-methyl-7-aminodecephalosporanic acid (I). This reaction is represented as follows:

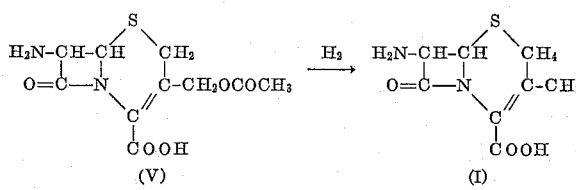

Furthermore, acid hydrolysis of Cephalosporin C yields not only 7-aminocephalosporanic acid (V) but the lactone, 3-hydroxymethyl-7-aminodecephalosporanic acid lactone as well, which is represented below:

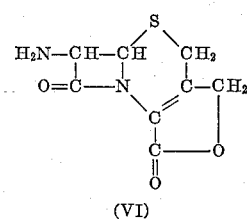

This compound (VI) may also be subjected to the above hydrogenation procedure to yield the compound, 3-methyl-7-aminodecephalosporanic acid (I).

The novel heterocyclic nuclei of my invention represented by Formula I yields an active antimicrobial compound when treated with certain amine-reactive agents, as for example when treated with phenylacetyl chloride so as to form 3-methyl-7-(phenylacetamido)-decephalosporanic acid. Alternatively, other acylating agents such as lower alkanoic acid chlorides can be employed to obtain the corresponding derivatives. These derivatives exhibit a high degree of antimicrobial activity against certain micro-organisms, particularly the so-called penicillin-resistant Staphylococci. The particular derivative may be administered to an infected animal as the free acid or as one of the usual pharmaceutically acceptable non-toxic salts such as the potassium, sodium or the ammonium salts in any of the usual pharmaceutical forms, as for example tablets, capsules, ointments, suspensions, solutions and the like.

The following examples will further serve to typify the mode of my invention but should not be construed as limiting the scope thereof, the scope being defined only by the appended claims.

Example 1

Cephalosporin C sodium salt dihydrate (.75 g.) in sufficient water to effect dissolution is added to an aqueous suspension of 2.0 g. of 10% palladium on carbon in 30 ml. of water which has been previously saturated with hydrogen. The mixture is hydrogenated with agitation at one atmosphere pressure for 1 hour.

The catalyst is removed by centrifugation and the supernatant is preserved. The catalyst is then extracted with 80% aqueous methanol at pH 8, and these extracts then adjusted to pH 6 by the addition of hydrochloric acid. The extract is evaporated to a small volume and added to the original reaction solution. The combined solution is then brought to pH 6 with sodium hydroxide and lyophilized to yield 3-methyl-7-(ω-aminoadipoylamido)-decephalosporanic acid as the sodium salt.

Example 2

The product obtained in Example 1 (.3 g.) is dissolved in 7 ml. of water containing .25 g. of anhydrous sodium bicarbonate. To this stirred solution is added .25 g. of 1-fluoro-2,4-dinitrobenzene in 7 ml. of ethyl alcohol. The mixture is stirred in the dark at room temperature for 2½ hours. The pH of the solution is then adjusted to 5 by the addition of concentrated hydrochloric acid and the alcohol is removed under reduced pressure.

The mixture is adjusted to pH 7 by the addition of sodium bicarbonate and extracted with ether to remove excess 1-fluoro-2,4-dinitrobenzene, yielding a clear aqueous solution. The pH is adjusted to 2.5 by the addition of concentrated hydrochloric acid and extracted several times with ethyl acetate. These ethyl acetate extracts are washed with water, dried over anhydrous sodium sulfate and evaporated to yield 3-methyl-7-[ω-(2,4-dinitrophenylamino)-adipoylamido]-decephalosporanic acid.

Example 3

The solid obtained in Example 2 (1 g.) is dissolved in 10 ml. of acetonitrile and 10 ml. of N-hydrochloric acid. This solution is stored in the dark at 37° C. under nitrogen for 64 hours.

At the end of this time, 20 ml. of water are added to this solution and the solution then extracted five times with 10 ml. portions of ethyl acetate. The residual solution is then brought to pH 6 with N-sodium hydroxide, and added to a column of Dowex-1 (×8) (acetate form, 3 cm. x 5 cm.). When all of the solution has been introduced onto the column, the column is washed with 60 ml. of water and then the product eluted with 2 N acetic acid. Lyophilization of the acetic acid eluate yields the product, 3-methyl-7-aminodecephalosporanic acid as a solid.

*Example 4*

7-aminocephalosporanic acid (.5 g.) is employed in the procedure of Example 1 in place of Cephalosporin C. There is thus obtained upon execution of the steps therein described, the compound 3-methyl-7-aminodecephalosporanic acid.

*Example 5*

To 4.3 g. of 3-methyl-7-aminodecephalosporanic acid in 190 ml. of 3% aqueous sodium bicarbonate solution and 120 ml. of acetone is added 3.08 g. of phenylacetyl chloride. The reaction mixture is maintained at 25° C. for 1½ hours and then extracted twice with 150 ml. of ether. To the residual aqueous solution is added 40 ml. of butyl acetate, the mixture cooled below 10° and the pH adjusted to 2.4 with 20% phosphoric acid. The phases are separated and the aqueous phase extracted with 15 ml. of butyl acetate. The combined butyl acetate solutions are washed with 10 ml. of water and the washed organic solution next dried over magnesium sulfate and filtered. To the filtrate is added 9.6 ml. of 30% potassium 2-ethylhexanoate in isopropanol. One volume of ether is then added with stirring and the solid which forms upon cooling is collected by filtration, washed with 1:1 ether-butyl acetate, then ether and finally dried to yield 3-methyl-7-(phenylacetamido)-decephalosporanic acid as the potassium salt.

Treatment of an aqueous solution of this potassium salt with hydrogen chloride and extractions with ether then yields the free acid, 3-methyl-7-(phenylacetamido)-decephalosporanic acid.

I claim:

1. In the process for the preparation of the compound of the structural formula:

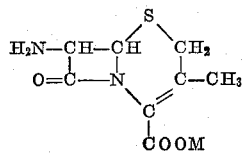

wherein M is selected from the group consisting of hydrogen and alkali metal cations, the step which comprises subjecting a compound selected from the group consisting of Cephalosporin C and 7-aminocephalosporanic acid to catalytic hydrogenation wherein said catalyst is palladium-on-an-inert carrier.

2. In the process for the preparation of the compounds of the structural formula:

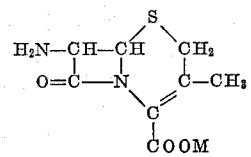

wherein M is selected from the group consisting of hydrogen and alkali metal cations, the steps which comprise subjecting Cephalosporin C to catalytic hydrogenation wherein said catalyst is palladium-on-an-inert carrier and thereafter subjecting the product thereby formed to acid hydrolysis.

3. In the process for the preparation of the compound of the structural formula:

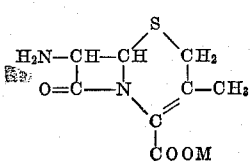

wherein M is selected from the group consisting of hydrogen and alkali metal cations, the steps which comprise subjecting Cephalosporin C to catalytic hydrogenation wherein said catalyst is palladium-on-an-inert carrier, treating said hydrogenation product with a reagent selected from the group consisting of 1-fluoro-2,4-dinitrobenzene and 1-fluoro-2-nitro-4-carbomethoxybenzene and thereafter subjecting the product thereby formed to acid hydrolysis.

4. In the process for the preparation of the compound of the structural formula:

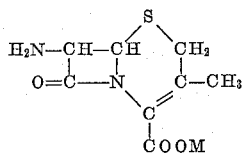

wherein M is selected from the group consisting of hydrogen and alkali metal cations, the step which comprises subjecting 7-aminocephalosporanic acid to catalytic hydrogenation wherein said catalyst is palladium-on-an-inert carrier.

5. A compound of the structural formula:

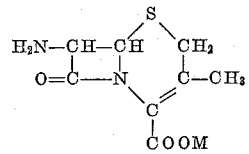

wherein M is selected from the group consisting of hydrogen and alkali metal cations.

6. A compound of the structural formula:

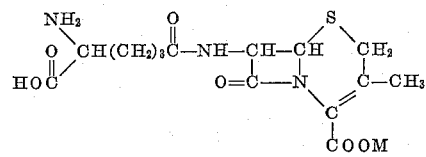

wherein M is selected from the group consisting of hydrogen and alkali metal cations.

7. A compound of the structural formula:

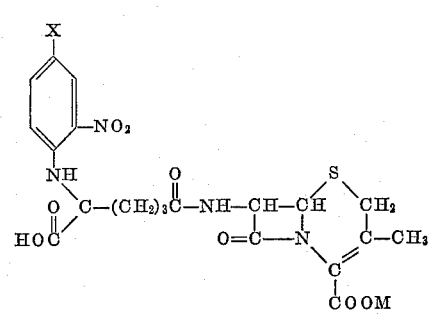

wherein M is selected from the group consisting of hydrogen and alkali metal cations and X is a member selected from the group consisting of nitro and carbomethoxy.

8. A compound according to claim 5 wherein X is nitro.

References Cited in the file of this patent

Newton et al.: Biochem. J., volume 62, pp. 651–657 (1956).

Disclaimer 3,124,576.—*Robert John Stedman*, Melrose Park, Pa. INTERMEDIATES FOR THE PREPARATION OF ANTIMICROBIAL AGENTS AND PROCESSES FOR THEIR PREPARATION. Patent dated Mar. 10, 1964. Disclaimer filed June 15, 1973, by the assignee, *Smith Kline & French Laboratories*.

Hereby enters this disclaimer to claims 1, 2, and 6 of said patent.

[*Official Gazette October 30, 1973.*]